(12) United States Patent
Hynecek

(10) Patent No.: US 7,218,350 B2
(45) Date of Patent: May 15, 2007

(54) IMAGE SENSOR WITH DIGITAL OUTPUT AND INHERENT PIXEL NON-UNIFORMITY SUPPRESSION

(75) Inventor: Jaroslav Hynecek, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 855 days.

(21) Appl. No.: 10/610,091

(22) Filed: Jun. 30, 2003

(65) Prior Publication Data

US 2004/0263655 A1 Dec. 30, 2004

(51) Int. Cl.
*H04N 5/335* (2006.01)
(52) U.S. Cl. .................................................. 348/308
(58) Field of Classification Search ................ 348/308, 348/230.1
See application file for complete search history.

(56) References Cited

U.S. PATENT DOCUMENTS 5,461,425 A * 10/1995 Fowler et al. ............. 348/294
5,650,739 A * 7/1997 Hui et al. .................. 327/262
6,229,133 B1 5/2001 Hynecek
7,071,982 B2 * 7/2006 Luo et al. .................. 348/308
7,098,437 B2 * 8/2006 Ishikawa et al. ......... 250/208.2
2002/0176067 A1 * 11/2002 Charbon ................... 356/4.01

* cited by examiner

*Primary Examiner*—Tuan Ho
(74) *Attorney, Agent, or Firm*—Alan K. Stewart; W. James Brady; Frederick J. Telecky, Jr.

(57) ABSTRACT

The image sensing device provides a digital output for each pixel. As charge builds up in a pixel, the pixel output increases until it reaches a reference level. When the reference level is crossed the pixel is reset. This process is repeated several times in a given frame time cycle with the reference level steadily decreasing. The various reset times represent the light intensity on the pixel. For an image sensor array, the array is scanned multiple times during one image frame time cycle and the reference level is lowered each scan. This provides an image sensor that has built-in pixel non-uniformity suppression, digital output, and high sensitivity.

16 Claims, 3 Drawing Sheets

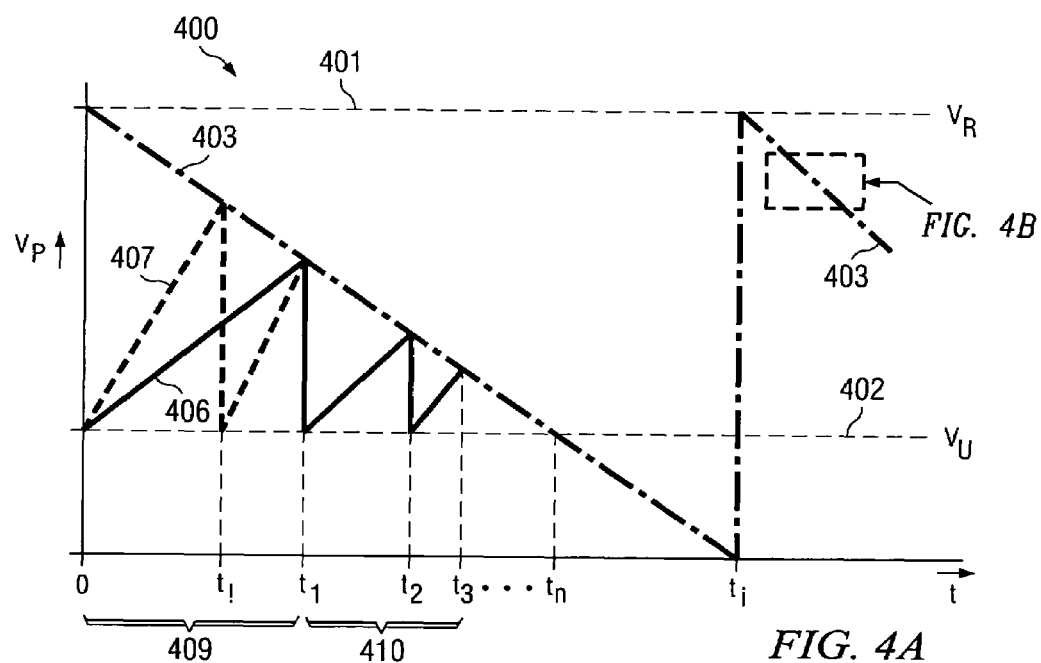
FIG. 4A
FIG. 4B
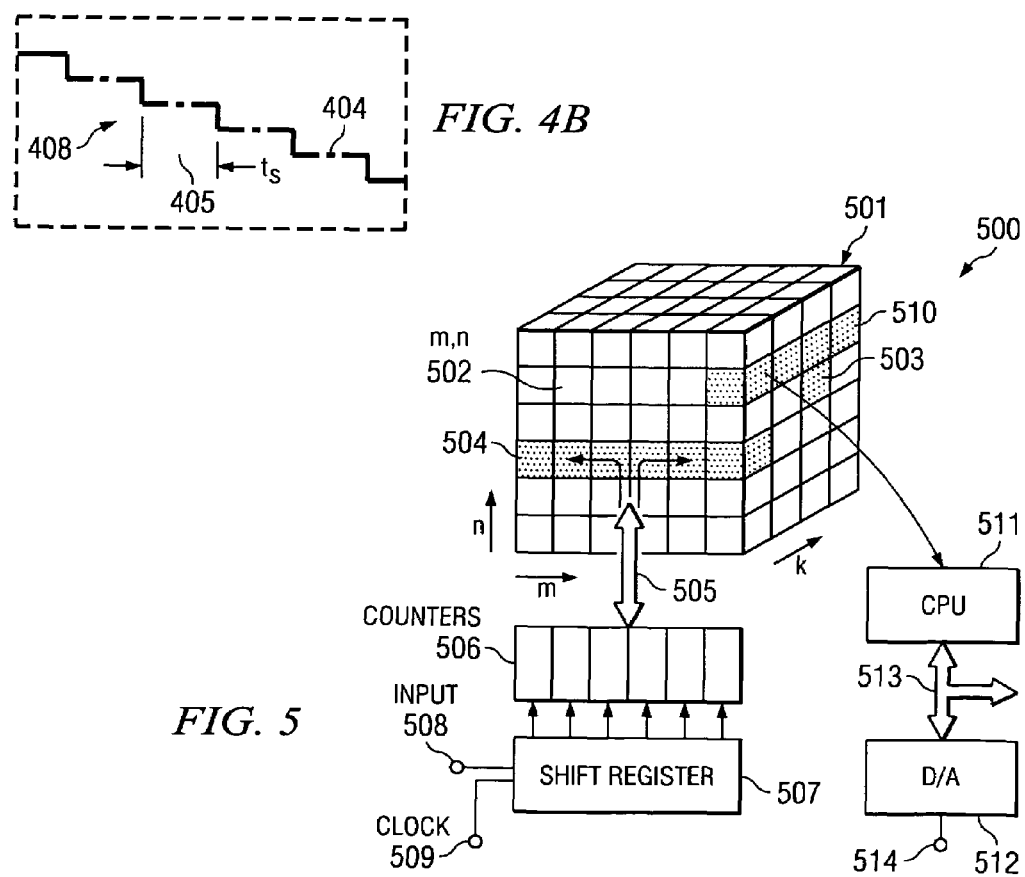
FIG. 5

IMAGE SENSOR WITH DIGITAL OUTPUT AND INHERENT PIXEL NON-UNIFORMITY SUPPRESSION

FIELD OF THE INVENTION

The present invention relates to solid-state image sensors, specifically to CMOS image sensors that have very low pixel non-uniformity and employ a single bit column A/D conversion.

BACKGROUND OF THE INVENTION

A typical image sensor senses light by converting impinging photons into electrons that are integrated (collected) in sensor pixels. After completion of integration cycle charge is converted into a voltage that is supplied to output terminals of the sensor. In CMOS image sensors the charge to voltage conversion is accomplished directly in the pixel itself and the analog pixel voltage is transferred to the output through various pixel addressing and scanning schemes. The pixels have incorporated in them a buffer amplifier, typically a source follower, which drives the sense lines that are connected to the pixels by suitable addressing transistors. The analog pixel signal can also be converted into a digital signal format on its way to the output. The digital signals are less susceptible to distortions, attenuation, and noise pickup and for this reason it is advantageous to make the conversion to digital format at the very beginning of the signal processing chain. Examples of sensors with signal conversion to digital format directly in the pixel itself can be found in U.S. Pat. No. 6,229,133 to Hynecek and in U.S. Pat. No. 5,461,425 to Fowler at al. However, this approach has also its own problems. The pixel with digital conversion incorporates many transistors and as a result has smaller aperture efficiency and sensitivity. Another problem is the A/D converter itself. The conversion typically relies on some reference voltage or a threshold to which the pixel output is compared. Since the pixel buffer amplifier has its own DC output offset level, that can vary from pixel to pixel, and the reference threshold of the A/D converter can also vary, the resulting digital output may be very non-uniform. This problem is tackled by using various analog readout schemes, such as the Correlated Double Sampling (CDS) that is applied before the A/D conversion. The CDS minimizes pixel non-uniformities by reading the pixel signal twice, once with charge and once without it. The difference is then free of the pixel DC level variations and the A/D conversion can take place. The CDS concept, however, does not eliminate non-uniformities in the column readout circuits even if the column readout is digital. The A/D converter threshold uniformity problems are minimized by using complicated self-calibrating and auto zeroing techniques as mentioned for example in the article: "A 1¼ inch 8.3 M Pixel Digital Output CMOS APS fro UDTV Applications" by: I. Takayanagi at al. published in: "Digest of Technical Papers 2003 IEEE International ISSCC Conference, pp. 216". Unfortunately such complicated systems can be used only in the array columns, since it would not be practical to integrate them into the pixels themselves. Such circuits also consume power and occupy a significant chip area thus contributing to increased cost of these sensors.

The sensor pixel non-uniformities, the column-to-column non-uniformities, and the A/D threshold variations thus represent persistent problem in CMOS image sensors that is not easily solved.

SUMMARY OF THE INVENTION

It is an object of the present invention to overcome limitations in prior art. It is further object of the present invention to provide a practical CMOS image-sensing concept that is not sensitive to pixel or column non-uniformities. It is yet another object of the present invention to provide a practical high performance image sensor that has digital output and high sensitivity. Incorporating the single bit A/D converter in each column of the array and selectively resetting the sensor pixels only when the pixel output exceeds a certain programmed reference level accomplishes this goal. The array is scanned many times during the standard image frame time cycle and the programmed level is changed for each scan. The signal output is calculated from the number of digital pulses obtained from the sensor pixel in a given frame time cycle. It is shown that the output is proportional to a certain ratio of pulse counts, which is independent of the pixel absolute DC output level or any other DC offset shift that may be encountered in the analog signal chain as for example in the comparator or the A/D converter. Thus incorporating the variable reference, the single bit column A/D, and using multiple array's scans in one frame time cycle in a CMOS image sensor together with computing certain timing interval ratios allows achieving the pixel non-uniformity and column-to-column non-uniformity suppression and other objects of the invention.

BRIEF DESCRIPTION OF THE DRAWINGS

In the drawings:

FIG. 4 is a timing diagram of the operation of one pixel of the array, as shown in FIG. 2;

FIG. 5 is a diagram of computation flow that is used for generation of the output signal from the digital pulse information provided by the sensor of the present invention.

DETAILED DESCRIPTION OF PREFERRED EMBODIMENTS

Figure 1:
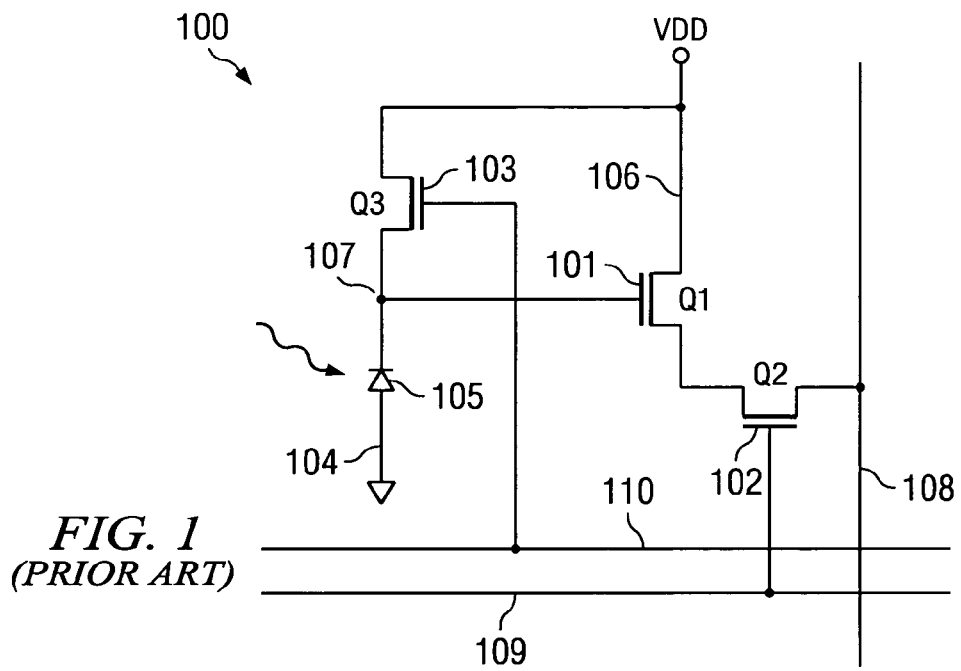
FIG. 1 is a circuit diagram of a prior art CMOS image sensor pixel.

In FIG. 1 the drawing 100 represents the circuit diagram of a prior art pixel used in CMOS image sensors. Transistor 101 (Q1) is connected as a source follower buffering the voltage of sense node 107. The source of transistor 101 is connected through addressing transistor 102 (Q2) to column sense line 108. Transistor 102 is turned on when horizontal (row) address line 109 is activated. Node 107 is reset when reset transistor 103 (Q3) is turned on. This is accomplished by activating another horizontal (row) line 110. When the rows of CMOS sensor array are always scanned in a sequential order, it is possible to eliminate row reset line 110 and use address line 109 of the neighboring pixel row for this purpose. This arrangement simplifies array wiring and usually increases the pixel aperture efficiency. The Vdd bias is supplied to the pixel through connection 106. Photo sensing element 105 is typically a reverse biased diode, but it can also be replaced by a pinned photodiode or any other suitable combination of similar light sensing elements. The important point to notice in this diagram, however, is that the reset command is supplied to pixels by row addressing lines and that all the pixels in the addressed row are reset at the same time.

Figure 2:
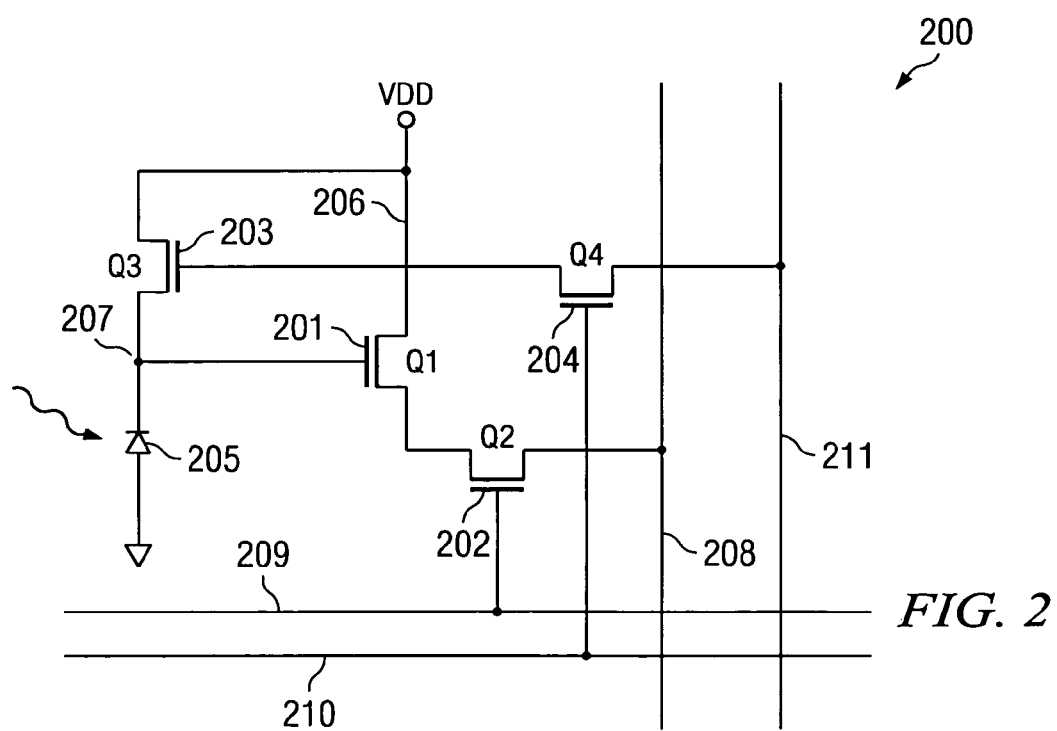
FIG. 2 is a circuit diagram of a CMOS image sensor pixel according to the present invention.

FIG. 2 represents the circuit diagram 200 of a pixel according to the present invention. Transistors 201 (Q1), 202 (Q2) and 203 (Q3) serve here the same purpose as transistors 101, 102, and 103 in the circuit diagram in FIG. 1. The new elements added to this pixel are transistor 204 (Q4) and reset column line 211. The reset signal will reach pixel-reset transistor 203 only when the appropriate row addressing line 210 is activated. Similarly as in the previous case, line 210 can be eliminated and line 209 of the neighboring row of pixels used in its place when the array is always scanned progressively. Line 210 can also be eliminated all together and the gate of transistor 204 connected to the same address line as the gate of address transistor 202. Sense line 208, Vdd connection 206, sense node 207, and photo-sensing element 205 correspond to the same elements described in the circuit diagram in FIG. 1. The key difference to note here, however, is that the reset signal for pixels is supplied via column lines 211 and not via the row reset lines. In the prior art case there is no possibility to selectively reset only some of the pixels in a row. The pixel circuit shown in FIG. 2 provides this important difference and capability. It is also clear to those skilled in the art that photo sensing element 205 can be replaced by many other light sensitive structures in particular those that have a complete charge reset and therefore do not generate kTC noise.

Figure 3:
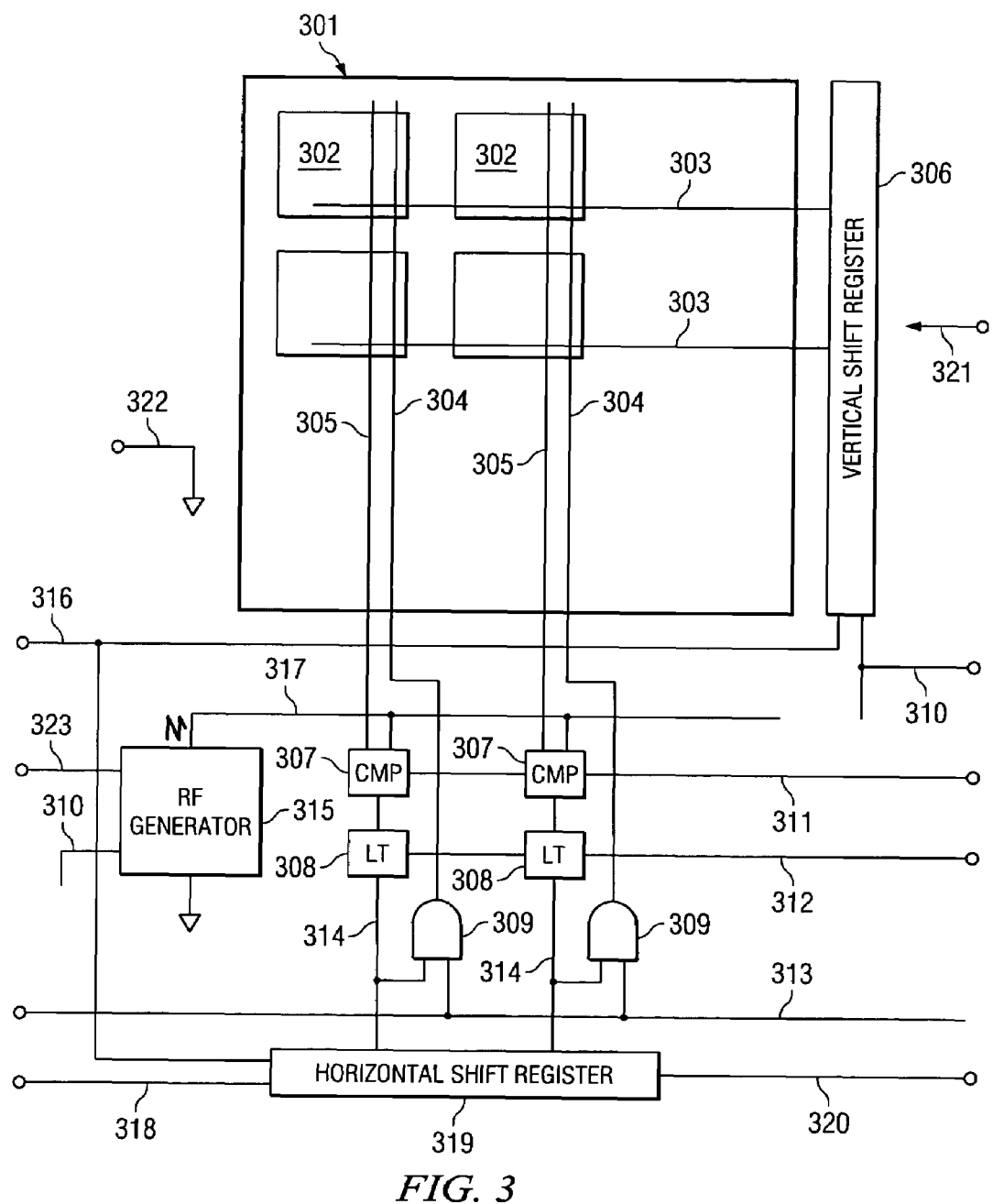
FIG. 3 is a block diagram of the layout floor plan of a CMOS image sensor according to the present invention.

FIG. 3 represents a block diagram 300 and a simplified floor plan of a CMOS image sensor that incorporates the present invention. Array 301 consists of pixels 302 that are addressed via vertical scanner 306 using row address lines 303. The pixel output is supplied through column sense lines 305 to a bank of comparators 307 located at the bottom edge of the array. Supplying an appropriate command signal through lines 311 activates comparators 307 and the addressed pixel output is compared with the reference voltage available on line 317 at that time. The outputs from comparators 307 are stored in latches 308 when the store command is applied to line 312. The logical output from latches 308 appearing on lines 314 is also loaded into horizontal scan register 319 for readout. The reset commands to reset the addressed pixels is supplied to pixels from "AND" gates 309 via column lines 304. The pixels are reset when the reset command is applied to "AND" gate inputs via line 313 and when the corresponding latches are in the state of logical "1". It is clear that not all of the pixels of an addressed row will be reset. The reset depends on the amount of integrated signal in the particular pixel and on the reference voltage level appearing on line 317. When the reset occurs, however, a logical "1" appears at the appropriate time for that pixel during the sensor readout sequence on output line 320. The horizontal register is readout by applying a clocking signal to line 318. When the horizontal register is completely readout a pulse is applied to line 316 that advances vertical addressing register 306 to select the next row of pixels for comparison and to reset the horizontal register making it ready for the next horizontal scan. This process is repeated until all the rows of the array are processed and read out. In the next step a pulse is applied to line 310. This pulse resets the vertical shift register to make it ready for the new array scan and at the same time causes reference generator 315 to decrement the reference voltage by one unit step. Finally, applying the reset pulse to line 323 resets the reference generator 315. This completes the sensor frame time cycle. It is clear that the sensor array is completely scanned many times during one frame time cycle and that the number of scans equals the number of decrements of the reference voltage. The power is applied to the sensor through line 321 and the ground connection is established through line 322. The described example represents a sensor with only a single serial digital output. It is clear to those skilled in the art that the digital signal loaded into horizontal register 319 can be formatted in many ways and that multiple serial/parallel output combinations are possible to increase the data throughput when required by a particular device application. Various layout modifications are also possible with comparators and serial registers located on both the top and the bottom edges of the array.

The operation of the system can be best understood with the help of the timing diagram 400 appearing in FIG. 4. The diagram shows graph 406 representing signal in a pixel ($V_p$) and graph 403 representing voltage of the reference generator ($V_r$), both as a function of time. When the pixel signal exceeds the reference level, the pixel is reset. This occurs at times $t_1$, $t_2$, $t_3$, ... and continues until the time $t_n$ when level 402 is crossed. After this point the pixel is always reset until the end of the frame time cycle ti. Level 402 ($V_{tu}$) represents the pixel DC output in dark and all other thresholds encountered in the analog signal chain. The variations of this threshold would normally cause pixel-to-pixel non-uniformities. When more intense light impinges on the pixel the slope of graph 406 increases as is indicated by graph 407. It can be shown that the output signal representing light intensity is proportional to ratio $(t_n-t_1)/t_1$, which is the time interval 410 divided by the time interval 409. From this figure it can be easily observed that this ratio is independent of level 402 providing that the reference voltage is decremented linearly in time from level 401 and the pixel voltage grows linearly with time. The detail of the reference voltage graph is shown enlarged in inset 408. The graph consists of unit step decrements 404, as described previously, that stay constant during time intervals 405 ($t_s$) when the array is scanned. The linearity of both waveforms 403 and 406 is not too difficult to achieve. A suitable D/A converter can easily generate the required reference voltage waveform. This is well known to those skilled in the art and will not be further discussed here. The pixel response to illumination is also known to be quite linear, however, some precautions are necessary since the capacitance of the sense node generally depends on voltage. In an actual device it may not be possible to exactly detect the time point $t_n$. This is due to discrete nature of time that is measured in increments of $t_s$ and due to discrete nature of reference voltage waveform 403. However, it is always possible to compute the time point $t_n$ from any of the preceding times $t_1$, $t_2$, $t_3$, .... There are many ways to compute this time interval value that can be devised by those skilled in the art.

An example of realization of data processing flow 500 and computation of the output signal is shown in FIG. 5. The digital output from the sensor is received at input terminal 508 of shift register 507. The register is clocked by a clock signal applied to terminal 509. Each stage of register 507 interfaces with corresponding counter 506. Each pixel (m,n) of the sensor has a corresponding stack of memory locations 502 (m,n) in the memory block 501 that are "k" places deep. When shift register 506 receives all the data for a given addressed line of the sensor, counters 506 are activated and loaded with data stored in memory locations 504 via bi-directional data bus 505. This is performed for all the pixels in that line simultaneously. In the next step counters 506 for each pixel, which has not been reset and therefore does not contain logical "1", are advanced by one count. The result is placed back in same locations 504 into memory block 501. However, when the pixel has been reset, the result for this pixel is placed in a different memory location, for example location 503 situated deeper in the memory block. The counters will not retrieve this result any more and this count will not be advanced again during the current frame time cycle. This process is repeated for all the lines and for all the array scans in a given frame time cycle. At the end of the frame time cycle, memory locations for each pixel will thus contain counts corresponding to times $t_1$, $t_2$, $t_3$ ... shown in FIG. 4. The output signal is obtain by scanning memory block 501 pixel by pixel and calculating the output for each pixel from data contained in each pixel memory stack 510. Suitable CPU or DSP device 511 can be used for this purpose and calculate the simple time interval ratios or other more complex and accurate mathematical expressions that can be derived for the output signal. The result is supplied to other systems in a digital format through port 513 or it can be converted to analog format by suitable D/A converter 512 to make it available for display at terminal 514. After the readout is completed all the memory locations can be reset and the process repeated. There are many variations and alterations possible for this system as is clear to those skilled in the art.

Having described preferred embodiments of a novel digital CMOS image sensor concept with 1-bit column A/D converter that has built in pixel non-uniformity suppression, which are intended to be illustrative and not limiting, it is noted that persons skilled in the art can make modifications and variations in light of the above teachings. It is therefore to be understood that changes may be made in the particular embodiments of the invention disclosed, which are within the scope and spirit of the invention as defined by the appended claims.

What is claimed is:

1. A method for sensing light comprising:
   accumulating charge on a light sensing element in response to incident light;
   comparing a charge level in the light sensing element to a variable reference level;
   resetting the light sensing element if the charge level has reached the reference level;
   changing the variable reference level; and
   repeating the above steps "n" times in a set period of time, where "n" is an integer.

2. The method of claim 1 wherein the reference level is lowered each time the steps are repeated.

3. The method of claim 1 wherein the reference level is lowered a unit amount each time the steps are repeated.

4. The method of claim 1 wherein a logic output is stored in memory each time the charge level reaches the reference level.

5. The method of claim 2 wherein a logic output is stored in memory each time the charge level reaches the reference level.

6. A method for sensing an image in an array of light sensing pixels comprising:
   accumulating charge in the array of light sensing pixels in response to incident light;
   comparing charge levels in each pixel in a row of light sensing pixels to a variable reference level;
   resetting pixels that have charge levels that have reached the reference level;
   repeating the above steps for each row of light sensing pixels in the array;
   changing the variable reference level; and
   repeating the above steps "n" times in a set period of time, where "n" is an integer.

7. The method of claim 6 wherein the step of changing the reference level comprises lowering the reference level.

8. The method of claim 6 wherein the step of changing the reference level comprises lowering the reference level a unit amount.

9. The method of claim 6 wherein a logic output is stored in memory for each pixel each time the charge level of that pixel reaches the reference level.

10. The method of claim 6 further comprising repeating the steps for each frame of an image.

11. A light sensing device comprising:
    a light sensing element for accumulating charge in response to incident light;
    a comparator for comparing a charge level in the light sensing element to a variable reference level in response to a clocking signal, wherein the variable reference level is changed for each cycle of the clocking signal; and
    a resetting device for clearing charge from the light sensing element each time the charge level reaches the reference level.

12. The device of claim 1 wherein the reference level is lowered after each cycle of the clocking signal.

13. The device of claim 1 wherein the reference level is lowered a unit amount after each cycle of the clocking signal.

14. The device of claim 1 wherein a logic output is stored in memory each time the charge level reaches the reference level.

15. The device of claim 1 wherein the light sensing element is a photodiode.

16. The device of claim 1 wherein the light sensing element is in an array of light sensing elements.

* * * * *